US010005023B2

(12) United States Patent
Burgers et al.

(10) Patent No.: US 10,005,023 B2
(45) Date of Patent: Jun. 26, 2018

(54) METHOD AND SYSTEM FOR $CO_2$ REJECTION WITH A TWO STAGE MEMBRANE PROCESS

(71) Applicants: Kenneth L. Burgers, E. Amherst, NY (US); Richard A. Novak, Naperville, IL (US)

(72) Inventors: Kenneth L. Burgers, E. Amherst, NY (US); Richard A. Novak, Naperville, IL (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 164 days.

(21) Appl. No.: 15/072,969

(22) Filed: Mar. 17, 2016

(65) Prior Publication Data

US 2016/0279561 A1 Sep. 29, 2016

Related U.S. Application Data

(60) Provisional application No. 62/137,880, filed on Mar. 25, 2015.

(51) Int. Cl.
*B01D 53/22* (2006.01)
*B01D 53/26* (2006.01)
(Continued)

(52) U.S. Cl.
CPC ......... *B01D 53/226* (2013.01); *B01D 53/268* (2013.01); *B01D 71/52* (2013.01);
(Continued)

(58) Field of Classification Search
CPC .... C10L 3/104; C10L 3/106; C10L 2290/548; C10L 2290/567; C10L 2290/06;
(Continued)

(56) References Cited

U.S. PATENT DOCUMENTS 4,762,543 A  8/1988 Pentermuehl et al.
4,789,388 A * 12/1988 Nishibata ............... B01D 53/22
96/381

(Continued)

FOREIGN PATENT DOCUMENTS

WO  WO 2012/048078 A1  4/2012
WO  WO 2014/085057 A2  6/2014

OTHER PUBLICATIONS

Haiqing Lin, Lloyd S. White, Kaaeid Lokhandwala, Richard W. Baker, "Natural Gas Purification", *Encyclopedia of Membrane Science and Technology*, Membrane Technology and Research, Inc., Newark, CA, pp. 1-25.

(Continued)

*Primary Examiner* — Anthony Shumate
(74) *Attorney, Agent, or Firm* — Ralph J. Mancini

(57) ABSTRACT

The invention relates to a system and method of treating a flow back fluid exiting a well site following stimulation of a subterranean formation. The invention utilizes a two-stage membrane process during the period that the gas contains high concentrations of $CO_2$ by volume, and allows for separation of $CO_2$ from the natural gas components, providing pipeline-quality natural gas (approximately 5% $CO_2$ by volume) to the gas collection system.

34 Claims, 2 Drawing Sheets

(51) Int. Cl.
    *B01D 71/52* (2006.01)
    *C10L 3/10* (2006.01)
    *E21B 43/34* (2006.01)
(52) U.S. Cl.
    CPC .............. *C10L 3/104* (2013.01); *C10L 3/106* (2013.01); *E21B 43/34* (2013.01); *B01D 2256/245* (2013.01); *B01D 2257/504* (2013.01); *B01D 2257/80* (2013.01); *C10L 2290/06* (2013.01); *C10L 2290/548* (2013.01); *C10L 2290/567* (2013.01); *Y02C 10/10* (2013.01)
(58) Field of Classification Search
    CPC .. Y02C 10/10; B01D 2257/504; B01D 71/52; B01D 53/226; B01D 2257/80; B01D 53/268; B01D 2256/245; E21B 43/34
    See application file for complete search history.

(56) References Cited

U.S. PATENT DOCUMENTS

| | | | | |
|---|---|---|---|---|
| 5,401,300 | A | * | 3/1995 | Lokhandwala ........ B01D 53/22 95/49 |
| 5,407,467 | A | * | 4/1995 | Lokhandwala ........ B01D 53/22 95/49 |
| 5,964,923 | A | | 10/1999 | Lokhandwala |
| 6,648,944 | B1 | | 11/2003 | Baker et al. |
| 6,955,704 | B1 | | 10/2005 | Strahan |
| 7,252,700 | B1 | | 8/2007 | Strahan |
| 8,424,784 | B1 | * | 4/2013 | Munisteri ............. E21B 43/267 241/21 |
| 2004/0214726 | A1 | * | 10/2004 | Tudor ...................... C09K 8/68 507/200 |
| 2005/0092594 | A1 | | 5/2005 | Parro et al. |
| 2006/0162924 | A1 | | 7/2006 | Blevins et al. |
| 2009/0050572 | A1 | * | 2/2009 | McGuire ................. C02F 1/004 210/638 |
| 2010/0232985 | A1 | | 9/2010 | Jensvold et al. |
| 2012/0000355 | A1 | | 1/2012 | Sharma et al. |
| 2012/0085238 | A1 | | 4/2012 | Zhou et al. |
| 2012/0157743 | A1 | | 6/2012 | Liu et al. |
| 2014/0121970 | A1 | * | 5/2014 | Ljungdahl ............. E21B 49/005 702/6 |
| 2014/0243572 | A1 | | 8/2014 | Straub et al. |
| 2015/0337639 | A1 | * | 11/2015 | Nevison ................. E21B 43/26 166/250.03 |
| 2015/0345258 | A1 | * | 12/2015 | Sanborn ............... E21B 41/005 166/311 |
| 2017/0176100 | A1 | * | 6/2017 | Acharya ........... B01D 19/0068 |

OTHER PUBLICATIONS

T.E. Rufford, et al., "The removal of $CO_2$ and $N_2$ from natural gas: A review of conventional and emerging process technologies", *Journal of Petroleum Science and Engineering*, 2012, pp. 123-154.

Yuan Zhang, et al., "Current status and development of membranes for $CO_2/CH_4$ separation: A review", *International Journal of Greenhouse Gas Control 12*, 2013, pp. 84-107.

Richard W. Baker, et al., "Natural Gas Processing with Membranes: An Overview", *Ind. Eng. Chem. Res*, 2008, 47, pp. 2109-2121.

Colin A. Scholes, et al., "Carbon Dioxide Separation through Polymeric Membrane Systems for Flue Gas Applications", *Recent Patents on Chemical Engineering*, 2008, 1, pp. 52-66.

Paola Bernardo, et al., "30 Years of Membrane Technology for Gas Separation", *Chemical Engineering Transactions*, vol. 32, 2013, pp. 1999-2004.

Richard W. Baker, "Future Directions of Membrane Gas Separation Technology", *Ind. Eng. Chem. Res.* 2002, 41, pp. 1393-1411.

Dr. Kaaeid A. Lokhandwala et al., "High Performance Contaminant Resistant Membranes Minimize Pretreatment and Improve $CO_2$, Removal Economics", *Membrane Technology and Research, Inc.*, Menlo Park, CA, Houston, TX.

Michael Freemantle, "Membranes for Gas Separation", *Chemical & Engineering News*, Oct. 3, 2005, vol. 83, No. 40, pp. 49-57.

Reza Abedini, et al., "Application of Membrane in Gas Separation Processes: Its Suitability and Mechanisms", *Petroleum & Coal ISSN 1337-7027*, Apr. 30, 2010 and Jun. 15, 2010, pp. 69-80.

David Dortmundt, et al., "Recent Developments in $CO_2$ Removal Membrane Technology", 1999 UOP LLC, des Plaines, Illinois, pp. 1-31.

* cited by examiner

FIG. 2

Wet Gas 40% CO$_2$ mol flows 1200 psig, 120°F inlet conditions, Process Simulation Results Overview

| PFD stream no: | 1 | 5 | 7 | 14 | N/A | 21 | 9 | 18 | 22 |
|---|---|---|---|---|---|---|---|---|---|
| Description | Feed | Cond. Water | H2O removal: M1 perm | CO2 removal: M2 perm | M1 + M2 perm | NGL flash vapor | Streams to flare | Product Natural Gas | Product NGLs |
| Molar flows, lbmol/hr | | | | | | | | | |
| Methane | 214.52 | 0 | 9.4 | 53.9 | 63.3 | 16.6 | 79.8 | 132.9 | 1.85 |
| CO2 | 220.04 | 0 | 22.6 | 175.5 | 198.1 | 9.2 | 207.3 | 9.9 | 2.85 |
| NGLs | 108.6 | 0 | 6.5 | 6.9 | 13.4 | 9.5 | 22.9 | 36.4 | 49.5 |
| H2O | 1.51 | 0.5 | 0.9 | 0.02 | 0.92 | 0.02 | 0.95 | 0.02 | 0.04 |
| % of inlet content | | | | | | | | | |
| Methane | 100% | 0% | 4% | 25% | 30% | 8% | 37% | 62% | 1% |
| CO2 | 100% | 0% | 10% | 80% | 90% | 4% | 94% | 4% | 1% |
| NGLs | 100% | 0% | 6% | 6% | 12% | 9% | 21% | 34% | 46% |
| H2O | 100% | 33% | 60% | 1% | 61% | 1% | 63% | 1% | 3% |

METHOD AND SYSTEM FOR $CO_2$ REJECTION WITH A TWO STAGE MEMBRANE PROCESS

RELATED APPLICATION

This application claims the benefit of U.S. Provisional Application Ser. No. 62/137,880, filed on Mar. 25, 2015, which is incorporated herein by reference.

FIELD OF THE INVENTION

The present invention relates to a method and system for treating a flow back fluid exiting a well site following stimulation of a subterranean formation.

DESCRIPTION OF BACKGROUND ART

Fracturing of various subterranean formations with water, carbon dioxide, and other carrier fluids has been practiced for some time. It will be understood by those skilled in the art that fracturing fluid, carrier gas or simply gas, as utilized herein, refers to liquid phase, gas phase, supercritical fluid, or combination thereof. Typically, wells stimulated with a $CO_2$ based fracturing fluid (which may include water or some other fluid), after separation of any solids, liquids and/or oil, emit an initial raw fluid, often referred to as flow back fluid, that is a mixture of fracturing fluid $CO_2$ and reservoir fluid. Thus, flow back fluid can contain natural gas, other hydrocarbons and contaminates, such as hydrogen sulfide ($H_2S$), water ($H_2O$) and $CO_2$.

The initial gas flow from the well stimulated with a $CO_2$ based fracturing fluid contains high $CO_2$ concentrations (80-100%), with the balance of the gas formed by methane, other light hydrocarbons, water, and minor components. If no treatment of the gas is performed during this period, the entire gas flow would need to be flared as the $CO_2$ content is too high to proceed into the gas gathering pipelines. The flow back $CO_2$ concentration declines over time as the gas continues to flow, so that after approximately 10-30 days the $CO_2$ concentration falls to a level of 5-10% $CO_2$ or lower.

The fluid from the well cannot be sent to a downstream processing facility or pipeline as product until is below the maximum specified $CO_2$ concentration. The requirement for $CO_2$ concentration for downstream processing facility or pipeline gas is typically in the range of 2-10 mol %. In many cases, the fluid/gas is vented or flared until it meets the $CO_2$ concentration specification, at which point it can be used as a product. When flow back fluid contains >70% $CO_2$, flaring operation requires addition of natural gas to maintain or otherwise render the flaring operation self-sustainable. Thus, the valuable hydrocarbons contained in the fluid exiting the well are initially wasted and additional natural gas is utilized.

One object of this invention is to provide a method and system for treating flow back gas utilizing a two-stage membrane process during the period that the gas contains high concentrations of $CO_2$ by volume, separating the $CO_2$ from the natural gas components, and providing pipeline-quality natural gas (approximately 5% $CO_2$ by volume) to the gas collection system. A secondary object is to recover condensable hydrocarbons and provide those liquids to the onsite storage system. The liquids which condense from the flowback gas are described herein as natural gas liquids, or NGL. A further object is to recover $CO_2$ from flow back fluid of a newly fractured well, which can be liquefied and reused to fracture a nearby well and reduce the logistical issues of providing large amounts of liquid $CO_2$ to often remotely-located wells. Additional equipment would be required to allow for the recovery of $CO_2$ in combination with the system described herein, as taught in U.S. patent application Ser. No. 14/166,304 filed Jan. 28, 2014, which is incorporated herein by reference.

Use of the method and system of the invention allows recovery of valuable natural gas and natural gas liquids at an earlier point in the production of the well, and avoids flaring of the entire well output during the initial 30 days or so of initial gas flow. Furthermore, the method and system of the invention allows one to (a) reduce the cost of providing $CO_2$ for well fracturing, (b) reduce the natural gas consumption necessary for flaring operations and (c) recover gaseous and liquid hydrocarbons separately.

Other objects and aspects of the present invention will become apparent to one of ordinary skill in the art upon review of the specification, drawings and claims appended hereto.

SUMMARY OF THE INVENTION

The invention relates to a system and method of treating a flow back fluid exiting a well site following stimulation of a subterranean formation. The invention utilizes a two-stage membrane process during the period that the gas contains high concentrations of $CO_2$ by volume, and allows for separation of $CO_2$ from the natural gas components, providing pipeline-quality natural gas (approximately 5% $CO_2$ by volume) to the gas collection system.

In one embodiment the invention relates to a method of processing the flow back fluid from a well site utilizing a two-stage membrane system. The method comprises:

optionally processing the flow back gas exiting a well bore in a pretreatment unit to remove undesirables from the fluid including, but not limited to any one of water, solid particulates, liquid hydrocarbons, hydrogen sulfide or a combination thereof to obtain a pretreated flow back fluid;

processing said (pretreated) flow back fluid in a first stage membrane unit downstream of the pretreatment unit to separate water and/or water vapor from the pretreated flow back fluid, forming a water-rich permeate stream and a water depleted, flow back stream;

processing said water depleted flow back stream in a second stage membrane unit downstream from said first stage membrane unit to separate out $CO_2$ from said water depleted flow back stream forming a carbon dioxide rich permeate stream and a carbon dioxide depleted flow back stream rich in hydrocarbons.

In another embodiment, the present invention relates to a system for processing the flow back fluid from a well bore following stimulation of a subterranean formation. The system includes:

optionally, a pretreatment unit to receive and process the flow back fluid from the well site and remove undesirables from the fluid including but not limited to any one of water, solid particulates, liquid hydrocarbons, hydrogen sulfide or a combination thereof;

a first stage membrane unit downstream of the pretreatment unit to receive the pretreated flow back fluid therefrom and separate out water and water vapor from the pretreated flow back fluid, forming a water-rich permeate stream and a water depleted flow back stream;

a second stage membrane unit downstream from said first stage membrane unit to receive the water depleted flow back stream from said first stage membrane unit, for the separation of carbon dioxide from said water depleted flow back fluid forming a carbon dioxide rich permeate stream and a carbon dioxide depleted flow back stream rich in hydrocarbons.

Once the $CO_2$ concentration in the feed to the system has dropped to a lower range, the Joule-Thomson cooling effect in the second stage membrane is reduced, so that the temperature of the second stage will be above the temperature at which solids may form. Depending on the composition of the gas and the conditions of the gas stream, the solids that may form would include, for example, gas hydrates or water ice. Methods of estimating the temperature at which solids formation can occur is known in the art, and in the case of the solid water ice this temperature is the freezing point of water. When this occurs, the first stage membrane unit can be bypassed and the flow back gas exiting the well can be sent directly to the second-stage membrane unit for the removal of $CO_2$; the first stage water removal membrane unit is no longer required. Bypassing the first stage membrane unit will reduce hydrocarbon losses from the system. The point at which the first-stage membrane can be bypassed will depend on both the $CO_2$ concentration in the inlet gas and on the inlet gas temperature. For example, in the case where the inlet gas temperature is about 120° F., the first-stage membrane may be bypassed when the inlet $CO_2$ concentration has fallen below 50-55% by volume. Alternatively, referring now to FIG. 1, the Stage 1 Bypass operation can be initiated when the temperature of the retentate stream (13) leaving Membrane Unit 2 (X-101) is above the desired temperature limit chosen to avoid the formation of solids, such as gas hydrates or water ice. In the case of ice, for example, the temperature limit would be the freezing point of water, so that the preset temperature above about 32° F. would be employed, in another embodiment above about 35° F.

When the flow back gas $CO_2$ concentration in the carbon dioxide depleted flow back stream exiting the well site has dropped to below the specification for acceptance into the gathering system, typically in a range of from about 2 to about 10% $CO_2$ by volume, the system operation can be terminated and all flow back gas exiting the well can be sent directly to the gathering system.

The objects and advantages of the invention will be better understood from the following detailed description of the preferred embodiments thereof in connection with the accompanying figures wherein like numbers denote same features throughout.

DETAILED DESCRIPTION OF THE FIGURES

FIG. 2 shows the performance of a $CO_2$ rejection process in accordance with the present invention.

DETAILED DESCRIPTION OF THE INVENTION

Figure 1:
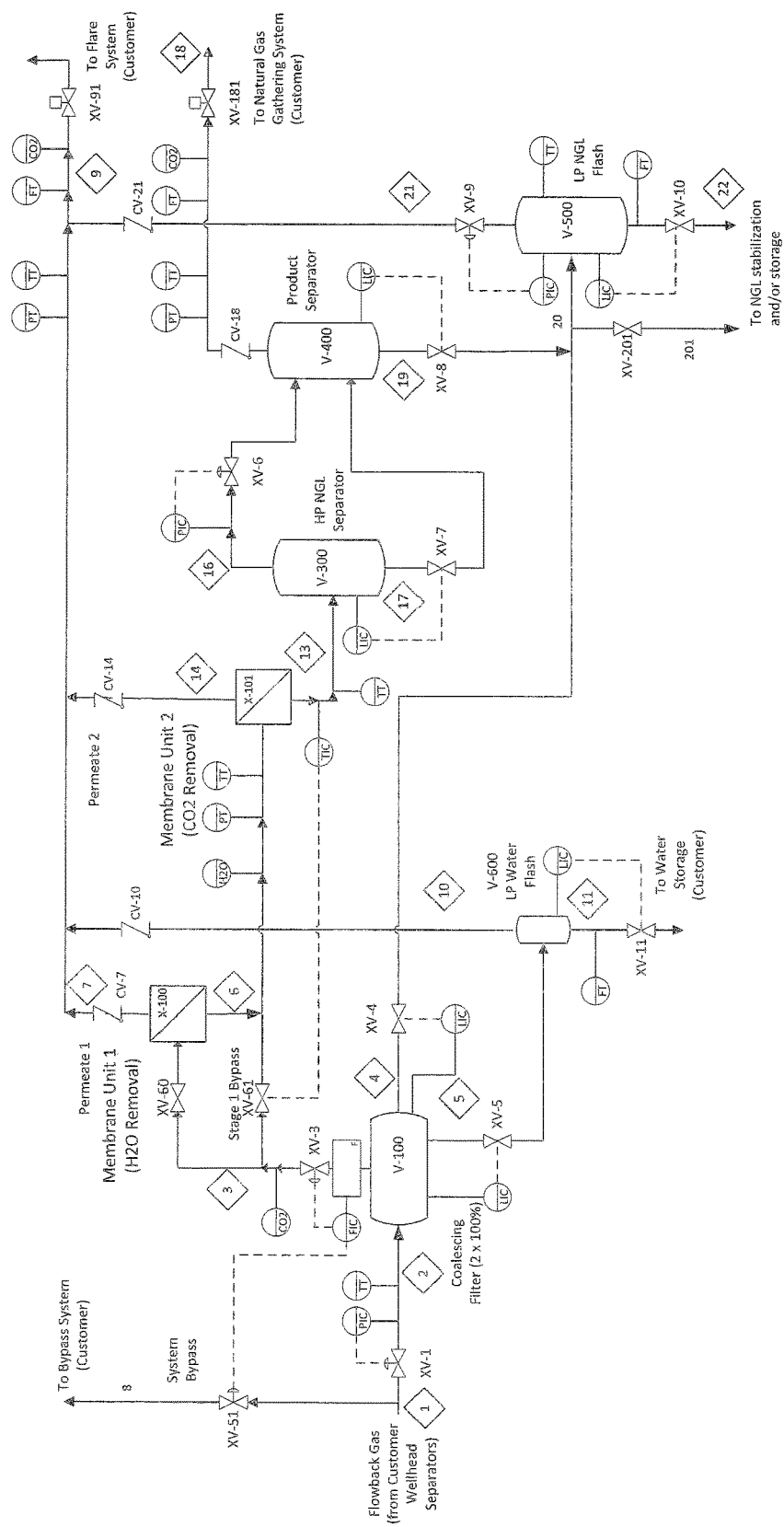
FIG. 1 is a schematic illustration of a system and associated process for treating the flow back fluid exiting a well site.

The present invention provides a system for the treatment of a flow back fluid exiting a well site immediately following stimulation of a subterranean formation until the concentration of the flow back gas approaches the natural $CO_2$ concentration in the reservoir, irrespective of the type of formation. Once the flow back gas $CO_2$ concentration has dropped to below the specification for acceptance into the gathering system, typically in a range of from about 2 to about 10% $CO_2$, the system operation can be terminated and all flow back gas exiting the well can be sent directly to a natural gas pipeline or processing plant.

The method and system of the invention, explained in detail herein, utilizes a two-stage membrane process for treating the flow back gas. The objective of the invention is to treat the flow back gas during the period immediately following the $CO_2$ stimulation of a formation, where the gas exiting the wellbore contains high amounts of carbon dioxide, i.e., approximately 5-80% $CO_2$ by volume. Once the $CO_2$ is separated from the natural gas components and the CO2 is reduced to acceptable levels, pipeline-quality natural gas (approximately 5% $CO_2$ by volume) can be supplied to the gas collection system. The system allows recovery of valuable natural gas and natural gas liquids at an early point in the production of the well, and avoids flaring of the entire well output during the period of initial gas flow.

The entire system or parts of the system can be designed to be mobile. After the $CO_2$ content of the flow back gas has naturally declined to low levels, the system is no longer needed for that particular well and it can be relocated to another well requiring $CO_2$ rejection.

In addition to supplying pipeline-quality natural gas to the gas collection system, a secondary purpose is to recover condensable hydrocarbons (natural gas liquids) and provide those liquids to the onsite storage system.

The operational modes of the invention during normal operation are summarized below.

Mode 1: Initial Flow of Well.

During approximately the first 24 hours of gas flow back, the entire gas flow is generally sent to flare and not processed by the system in part due to high and unstable gas pressures and flow rates, and due to large quantities of solids and liquids cleared out of the well, referred to as "dirty flow." The initial gas flow also typically contains low concentrations of recoverable methane and other hydrocarbons. In addition, during this period the gas is likely to contain very high $CO_2$ concentrations, which could result in second stage membrane temperatures below −20° F. if the gas were to be processed. For equipment cost considerations, it is desirable to avoid conditions that would require materials of construction with a Minimum Design Metal Temperature ("MDMT") of below −20° F.

Mode 2: Processing of Flow Back Gas, Two Membrane Stages.

Once the initial well flow period of Mode 1 operation is concluded, flow back gas with an acceptable $CO_2$ concentration is sent to the system for removal of both $H_2O$ and $CO_2$, and for capture of natural gas and natural gas liquids that condense at the system conditions.

Mode 3: Processing of Flow Back Gas—One Membrane Stage.

Once the flow back gas $CO_2$ concentration has dropped to a lower range, the Joule-Thomson cooling effect in the second stage membrane is reduced, so that the temperature of the second stage will be above the target temperature for prevention of solids formation (for example, the freezing point of water.) When this occurs, the first stage membrane unit is no longer required and can be bypassed, i.e., the flow back gas exiting the well can be sent directly to the second-stage membrane unit for the removal of $CO_2$. Bypassing the first stage membrane unit will also reduce hydrocarbon losses from the system. The point at which the first-stage membrane can be bypassed will depend on both the $CO_2$ concentration in the inlet gas and on the inlet gas temperature. For example, in the case where the inlet gas temperature is about 120° F., the first-stage membrane may be bypassed when the inlet $CO_2$ concentration has fallen below 50-55% by volume. Alternatively, the Stage 1 bypass operation can be initiated once the temperature of the retentate stream (13) leaving Membrane Unit 2 is at or above a preset temperature above the temperature at which solids may form in the gas stream. For example, if this temperature is estimated to be the freezing point of water, the preset temperature may be above about 35° F.

Mode 4: Cessation of Flow Back Treatment.

Once the $CO_2$ concentration of the flow back gas has dropped to below the specification for acceptance into the gathering system, typically 2-10% $CO_2$, the system operation can be terminated and all flow back gas can be sent directly to the gas gathering system.

With reference to FIG. 1, a more detailed description of the system for treating flow back gas exiting the well site is illustrated. Streams are referred to as (1), (2), (3), etc., valves are XV-1 through XV-61, vessels V-100 and higher, and membrane units are X-100 and X-101. Note that Membrane Units 1 and 2 are comprised of multiple membrane elements and housings operated in parallel.

Pretreatment—Coalescing Filter (V-100).

Flow back gas (1) provided to the system flows through a pressure regulating valve (XV-1). As the flow back gas pressure may vary from one well to another or during the operation of a single well, Valve XV-1 is used to drop the pressure of the flow back gas to a controlled level at or below the upper design pressure of the membranes in the system. For example, flow back gas supplied at a pressure of 1200 psig may be reduced to 900 psig through XV-1.

The pressure drop across XV-1 may produce some condensed liquid (water and/or hydrocarbons) in the stream. Ideally the flow back gas provided to the system is free of solid and liquid phases, though there may be some carryover of liquids or solids from the upstream separator. Gas leaving XV-1 (2) will therefore enter a combination separator/coalescing filter unit (V-100) to remove these components from the gas stream. V-100 may be designed for separate removal of the aqueous and hydrocarbon phases, if both phases are present. Condensed water (5) is removed through valve XV-5 on level control, while condensed hydrocarbons (4) are removed through valve XV-4 with a separate level control. Either or both of the liquid streams may contain small amounts of solids that may have been entrained in the incoming flow back gas (1). Gas flows through coalescing filter elements before leaving V-100 to filter out droplets or particulates.

The clean gas from V-100 (3) flows through a flow meter and flow control valve XV-3 to establish the gas flow rate entering the membrane units. The flow set point can be fixed, or can vary automatically in response to the product gas (18) $CO_2$ concentration, within the maximum and minimum flow constraints of the system. For example, if the $CO_2$ concentration in the product gas increases to a level that is higher than the desired upper limit, the flow set point can be lowered which will reduce the retentate flow rate, thereby tending to reduce the product $CO_2$ concentration until it is back in the desired range. Conversely, if the $CO_2$ concentration in the product gas drops to a level that is below the desired range, the flow set point can be increased which will increase the retentate flow rate, thereby tending to increase the product $CO_2$ concentration until it is back in the desired range.

Water Removal—Membrane Unit 1 (X-101).

Mode 2 Operation—Two Stage Membrane Process.

Operations begin with both membrane stages in operation (both water removal and $CO_2$ removal stages). Initially, when the flow back gas contains high concentrations of $CO_2$, generally above 50% $CO_2$, temperatures below the point at which solids may form (for example, the freezing point of water) can be present in the second stage $CO_2$-removal membrane. In this case, the gas leaving V-100 will flow through valve XV-60 into the first stage membrane unit, Membrane Unit 1 (X-100), for the removal of water vapor. Most of the water content of the gas, along with some $CO_2$ and hydrocarbon gases, passes through Membrane Unit 1 (X-100) from the high pressure side (900 psig) to the low pressure, permeate, side. The water-rich Permeate 1 (7) flows out of Membrane Unit 1 (X-100) to the flare header and is sent to the flare system. Permeate pressure can be controlled by the pressure drop in the flare system and maintained at a minimum level, such as 0-50 psig. Alternatively, permeate pressure may be controlled explicitly by means of back pressure control on the permeate side of the membrane to maintain a higher pressure on the permeate side of the membranes than is present in the flare or other downstream system receiving the permeate flow. This may be done to maintain the differential pressure across the membrane elements within desired limits to avoid damage to the membranes, or to provide a means of controlling permeation rate. This may also be done to maintain a higher permeate pressure that would be conducive to further processing of the permeate flow—for example, to facilitate downstream recovery of $CO_2$ by cooling and condensation. Retentate pressure in both Membrane Units 1 (X-100) and second stage membrane unit, Membrane Unit 2 (X-101), is controlled by back pressure regulation of the downstream HP NGL Separator (V-300).

Mode 3 Operation—One Stage Membrane Process.

During the course of the flow back process, the inlet $CO_2$ concentration to the system will eventually decline to level of less than about 50% by volume, such that temperatures below the solids formation temperature (for example, the freezing point of water) will no longer be an issue in the second stage membrane unit, Membrane Unit 2 (X-101). In that situation, the first stage water-removal membrane stage, Membrane Unit 1 (X-100), is no longer required and can be bypassed. Bypassing Membrane Unit 1 (X-100) will reduce the fraction of inlet gas sent to flare and will increase the overall system recovery of hydrocarbons. In the bypass operation, valve XV-60 feeding Membrane Unit 1 (X-100) will close and the Stage 1 Bypass valve XV-61 will open, allowing gas from V-100 (3) to flow directly to Membrane Unit 2 (X-101). The stage 1 bypass operation can be initiated when the temperature of the retentate stream (13) leaving Membrane Unit 2 (X-101) is above a predetermined level, for example 35° F.

$CO_2$ Removal—Membrane Unit 2 (X-101)

During Mode 2 operation, gas that has been dried in Membrane Unit 1 (X-100) leaves as high-pressure retentate (6) and flows to Membrane Unit 2 (X-101) for $CO_2$ removal. During Mode 3 operation, the Stage 1 Bypass is open such that gas leaving V-100 (3) will flow directly as feed gas to Membrane Unit 2 (X-101).

In Membrane Unit 2 (X-101), most of the $CO_2$ content of the gas, along with some $H_2O$ and hydrocarbon gases, passes through the membrane from the high pressure side, approximately 900 psig, to the low pressure permeate side, approximately 0-50 psig, or even higher in some situations, as in the operation of Membrane Unit 1 described above. The $CO_2$-rich Permeate 2 (14) flows out of the membrane to the flare header and is sent to the flare system. Permeate pressure is controlled by the pressure drop in the flare system.

Under some conditions of flow back gas composition (concentration of $CO_2$ and C2+ hydrocarbons) and inlet pressure and temperature, a combination of Joule-Thompson cooling from the pressure drop across the membrane and the concentration of condensable hydrocarbons will result in condensation of liquid hydrocarbons on the high-pressure (retentate) side of Membrane Unit 2 (X-101). The membrane elements and housing are designed to allow the liquid to drain to the bottom of the membrane shell. The retentate flow (13) leaving the membrane cartridges will be a two-phase flow when conditions allow condensation of hydrocarbons. Alternatively, the membrane shell may be designed with separate outlet passages for condensed liquid and gas flows from the retentate side.

There are five main membrane types and materials are known and commercially available for $CO_2$ separation, and any of these could potentially be employed in process and system of the invention in the $CO_2$ removal stage, and at least some could be used in the $H_2O$ removal stage. They include:

1. Selective Dense or Asymmetric Polymer Membranes: For Example:
    cellulose acetate
    polyimides
    polyamides
    perfluoropolymers
    polysulfone
    polycarbonates
    polyetherimides
    poly(ether ether ketone) or PEEK
        Additional polymer materials used for CO2 separation:
    cellulose triacetate
    fluoropolyimides
    poly(amide-imide)
    poly(dimethylsiloxane)
    Polyethylene oxide
    poly(phenylene oxide) with Nylon 6
    polyaniline
    polyaramides
    polyarylates
    polyarylene ether ketone
    polyether ketone
    polyetherimide
    polyethersulfone
    polyketone
    polyphenylene sulphide
    polypyrrolones
    polysemicarbazides
2. Facilitated Transport Membranes—Combination of a Polymer Membrane and a Reactive Agent
    Liquid support membranes: reactive agents can be water, aqueous carbonates, hydroxide salts, organic ammonium salts, amino-methyl-propanol, or alkanolamines (MEA, DEA, etc.). Membranes can be cellulose acetate, polyvinyl alcohol, or polypropylene.
    Fixed carrier membranes: for example, polyamines (such as polyvinyl amine) in poly(vinyl alcohol) or polysulfone matrix
3. Membrane Gas Absorption: Combination of Polymer Membrane and a Liquid Carrier
    Polymers used include: Polytetrafluoroethylene (Teflon), Polypropylene, Polyvinylidene fluoride
    Liquids carriers include: Amines, such as: Monoethanolamine, Diethanolamine, and Methyldiethanolamine; Potassium carbonates; Metal hydroxide solutions.
4. Inorganic Membranes—inorganic selective materials form membrane or may be supported with a porous metal or ceramic membrane. Selective materials include:
    Molecular sieves, including zeolites, aluminophosphates, silico-aluminophosphates, silica, and carbon molecular sieves
    Carbonized polymers
    Activated carbon
    Metal oxides (such as $BaTiO_3$ or MgO)
    Metal organic frameworks (MOFs)
5. Mixed Matrix Membranes—hybrid membranes composed of selective materials in a polymer matrix.
    Selective materials can be inorganic materials such as those listed above (zeolites, etc.), or can be organic materials such as polyethylene glycol.
    Almost any polymer can be used, for example: polysulfones, polyetherimides, polyimides, polyvinyl acetate, silicone rubber, polydimethyl siloxane Specific examples of suitable membranes include: CYNARA® cellulose acetate membranes from Cameron (Houston, Tex.), Separex™ cellulose acetate membranes from UOP (Des Plaines, Ill.), Z-Top™ perfluoropolymer membranes from MTR (Newark, Calif.), PRISM® polysulfone membranes from Air Products (Allentown, Pa.), MEDAL™ polyimide membranes from Air Liquide (Newport, Del.), cellulose tri-acetate (CTA) membranes from Cynara and polyimide $CO_2$ Membranes from UBE Americas (New York, N.Y.). However, in conditions where hydrocarbons may condense on the membrane surface, materials highly resistant to the effects of the condensed liquids are preferred. For example, a preferred fluid separator for this application can be a separation unit having polyether ether ketone (PEEK) membranes, which are suitable membrane separators to handle large fraction of $C_{2+}$ components and are commercially available in the form of the PEEK-SEP™ hollow fiber membranes from PoroGen Corporation (Woburn, Mass.). Most suitable are PoroGen's D Guard membranes for the first membrane separation stage (water removal), and PoroGen's S Guard membranes for the second membrane stage ($CO_2$ removal).

An example of the $CO_2$ rejection process, which produces natural gas and hydrocarbon condensates from flow back gas, are simulated based on the embodiment shown in FIG. 1; operating parameters are shown in Table 1 below, and estimated performance is shown in FIG. 2. The composition of gas sent to the inlet of the system may be changing over time and from one gas source to another. The example shown in Table 1 and FIG. 2 represents the performance of the system for a point in time when the inlet gas has the composition shown, as an illustration of the concept. The pressure of flow back gas to the second stage membrane unit, Membrane Unit 2 (X-101), is controlled at 915 psia and the permeate pressure is set at 20 psia. Natural gas liquids may be produced both at the pressure reduction step in the pretreatment unit V100 and in the retentate stream 13, depending on feed composition and conditions. As described herein, phase separators are used at both of these locations to separate the hydrocarbon condensates.

TABLE 1

| $CO_2$ Rejection Operating Conditions | |
|---|---|
| Membrane Feed Pressure, psia | 915 |
| Permeate Pressure, psia | 20 |
| Retentate $CO_2$ Concentration, mol % | 5.4% |

High Pressure Natural Gas Liquids (HP NGL) Separator (V-300)

Retentate (13) leaving the $CO_2$ removal Membrane Unit 2 (X-101) flows into the high pressure NGL separator (V-300). The separator is used to decant any condensed liquid from the gas so that reliable pressure control can be maintained for the membrane units by back pressure regulator XV-6, on the gas outlet of V-300. Condensed liquids are collected in the bottom of V-300 and removed by level control through valve XV-7.

Optionally, the membrane pressure-vessel shells can be modified to allow separate removal ports for gas and liquid. In this embodiment, condensed liquids would be removed directly from the membrane shells via the dedicated liquid port on level control, gas would be removed through the dedicated gas exit port through back pressure regulator XV-6, and vessel V-300 would not be required.

Product Separator (V-400)

High pressure gas (16) and condensed liquids (17) from the HP NGL Separator (V-300) are both sent to the Product Separator (V-400). V-400 is operated at the pressure required for the gas gathering system, which may be lower than the pressure of the membrane modules. For example, Membrane Units 1 (X-100) and 2 (X-101) may operate at 900 psig (controlled by XV-6 on the HP NGL Separator V-300), while the pipeline may require pressures no higher than 800 psig. V-400 allows any condensed hydrocarbons that would vaporize at the pipeline pressure to recombine with the product NG stream, particularly any methane that is dissolved in the NGL liquids. Product natural gas (18) leaves V-400 and flows to the gathering pipeline. The pressure of V-400 is controlled by the receiving pressure of the gathering pipeline. The residual condensed liquid stream (19) leaves on level control through XV-8.

Low Pressure NGL Flash (V-500)

The high-pressure condensed hydrocarbon stream (4) obtained from the Coalescing Filter (V-100) may be combined with the condensed hydrocarbon stream (19) from the Product Separator (V-400). The combined stream (20) flows into the LP NGL Flash vessel (V-500), which may be operated at a lower pressure as may be required by the natural gas liquids storage system (for example, 150 psig). Hydrocarbon and $CO_2$ gases that vaporize from the liquid at the set pressure of V-500 are removed through pressure control valve XV-9 and sent to flare or other use. Final product NGLs are removed on level control through XV-10 and sent to storage. As an alternative, the condensed liquids may be removed from the process at high pressure through valve XV-201 and sent as stream 201 to a downstream process for further treatment of the NGL stream.

Low Pressure Water Flash (V-600)

The high-pressure condensed water stream (5) obtained from the Coalescing Filter (V-100) flows into the LP Water Flash vessel (V-600), which is operated at the receiving pressure of the flare system. $CO_2$ and other gases that vaporize from the liquid at the low pressure of V-600 are removed (10) and sent to flare. Final condensed water (11) is removed on level control through XV-11 sent to storage.

Flare System

The System is designed to minimize the amount of gas that requires flaring or venting during the early flow back operation of the well. However, the $CO_2$ and $H_2O$ vapor separated from the product natural gas will need to be processed, as will any hydrocarbons removed through the membranes with the $H_2O$ and $CO_2$ or flashed off from low pressure (below pipeline pressure) streams. The processing of these streams may include flaring or venting as appropriate. For example, permeate streams from the membrane units (streams 7 and 14) and low pressure flash streams 10 and 21 from vessels V-600 and V-500, may be sent to a flare header, with the combined stream 9 sent to the flare system.

System Bypass (XV-51)

If the flow back gas flow exceeds the maximum flow capacity of the System, excess gas flow (8) can be diverted through System Bypass valve XV-51 and sent to the flare system. This can be set manually, or on automatic control when constraint limits have been reached on the flow control (XV-3) and/or pressure control (XV-1) systems. In addition, on automatic System shutdown the bypass valve XV-51 can be opened to maintain uninterrupted flow back from the well.

As noted above, to control product purity, i.e., the $CO_2$ concentration in natural gas product stream 18, the flow control valve XV-3 can be automatically adjusted. If the $CO_2$ concentration in stream 18 is above the set point, the flow set point can be decreased assuming that other constraints are not exceeded. If $CO_2$ concentration is below the set point, the flow set point can be increased accordingly.

Additionally, the operating pressure of the membranes can be set at any point between the maximum operating pressure of the membrane elements and the receiving pressure of the natural gas gathering system. Reducing membrane operating pressure would reduce system treatment capacity. This can be done with back pressure regulator XV-6 on V-300. Individual membrane elements can also be valved in or out of the flow for further adjustment of system capacity.

For either membrane stage, a heat exchanger may be added to the membrane inlet stream to raise or lower the membrane inlet temperature. This may be used, for example, to control the amount of condensation of liquids in the membrane stage—reducing or avoiding condensation by raising the inlet temperature, or increasing the condensation by reducing the inlet temperature.

The natural gas condensates removed from the retentate stream of membrane 2 can be vaporized in a heat exchanger, in whole or in part, and the vapor re-combined with the product natural gas stream if it is not desired to recover NGLs at the well head but instead recover them downstream in an external gas processing plant. The advantages of vaporizing the NGL stream, instead of heating the membrane gas inlet to avoid condensation, are lower heating duty and no impact on membrane selectivity.

Instead of sending the permeate streams or other byproduct streams (such as NGL flash stream 21) to flare, the streams may be recovered for fuel. The permeate streams may also be processed for $CO_2$ recovery.

The NGLs collected may be sent to high pressure and/or refrigerated storage, or may undergo further processing, including heating, distillation, compression, recycle, or recombining with product natural gas (as mentioned above). One preferred type of processing may be "stabilization" to remove $CO_2$ and methane content to lower levels so the NGLs will meet Y-grade specification for commercial transport and use. Methods of stabilizing the NGL stream are known in the art, and may include dehydration, desulfurization, heating, distillation, vapor/liquid separation, and injection of chemical agents to avoid hydrate formation. Depending on the type of stabilization process employed, it may be advantageous to transfer the NGLs to downstream treatment either at high pressure (shown as stream 201 in FIG. 1) or at a lower pressure (shown as stream 22 in FIG. 1).

The two condensate streams (from V-100 and from the second membrane stage) may not be combined but might be processed separately—for example if one stream is high in $CO_2$ content and the other is low.

Permeate pressure can be controlled to a different level than the flare system header pressure. For example, back-pressure regulating valves may be added to streams 7 and 14 to allow control of membrane permeate at a higher pressure. The permeate pressure can be used to control permeation rates through the membrane, or to provide a higher pressure permeate stream for further processing (such as $CO_2$ recovery).

The basic process scheme can be modified with addition of stream recycles (commonly used in membrane processes to increase recovery), compression, heating and/or cooling, to increase recovery of individual components. For example, the NGL flash vapor from V-500 may be compressed and recycled to the feed or the compressed stream can be sent to the NG pipeline or used as a fuel.

The membrane material used in the two stages may be different membrane types (specialized for $H_2O$ and $CO_2$ removal respectively) or may be the same type of membrane material operated in two stages, one stage operated to favor $H_2O$ removal and the other to favor $CO_2$ removal. If the same or similar type of membrane material is used in both stages, additional operational flexibility may be utilized in valving membrane modules in and out of the two stages to optimize capacity of each stage.

Performance of a $CO_2$ rejection process in accordance with the present invention, and based on the specific example feed conditions of 40 mole % $CO_2$, is shown in FIG. 2.

Approximately ⅓ of the inlet water is condensed and removed in the coalescing filter, of the rest, 90% is removed in the first membrane unit. About 10% of the $CO_2$ in the feed is removed with the water in membrane 1; 90% of the remaining $CO_2$ is removed in membrane 2.

Roughly 62% of the methane in the feed is recovered in the NG product, for this case, where the inlet $CO_2$ is 40% of the feed. Note that the recovery of methane will increase as the $CO_2$ fraction of the feed drops, reaching above 90% recovery for low inlet $CO_2$ content.

Approximately 30% of the feed methane and 12% of the feed NGL content is lost in the membrane permeate along with the $CO_2$ and $H_2O$. Overall recovery of the NGL content in the feed is 79%; 33% in the product natural gas and 46% in the product NGL stream. The NGL recovered represents 90% of the NGL's not lost to the membrane permeate. As noted above, the overall recovery of all hydrocarbons (methane and natural gas liquids) will increase as the fraction of carbon dioxide in the feed decreases as compared to the 40% $CO_2$ used in this example.

While the invention has been described in detail with reference to specific embodiments thereof, it will become apparent to one skilled in the art that various changes and modifications can be made, and equivalents employed, without departing from the scope of the appended claims.

We claim:

1. A two stage membrane process for treating a flow back gas exiting a well site following the $CO_2$ stimulation of a subterranean formation, wherein said process comprises:
    pretreating the flow back gas exiting the well site;
    processing said flow back gas in a first stage membrane unit to separate water and water vapor from the flow back gas, forming a water-rich permeate stream and a water depleted flow back stream;
    processing said water depleted flow back stream in a second stage membrane unit downstream from said first stage membrane unit to separate out $CO_2$ from said water depleted flow back stream forming a carbon dioxide rich permeate stream and a carbon dioxide depleted retentate flow back stream rich in hydrocarbons.

2. The process of claim 1 wherein the pretreatment comprises one or more of adjusting the pressure of the flow back gas, adjusting the temperature of the flow back gas, and/or removing any one of water, solid particulates, liquid hydrocarbons, hydrogen sulfides or a combination thereof from said flow back gas.

3. The process of claim 1 wherein said flow back gas is processed in said first stage membrane unit until the temperature of the retentate stream (13) leaving the second stage membrane unit is above the temperature at which solids may form, after which first stage membrane unit 1 is bypassed and the flow back gas exiting the well is routed directly to said second stage membrane unit 2.

4. The process of claim 3 wherein said flow back gas is processed in said first stage membrane unit until the temperature of the retentate stream (13) leaving the second stage membrane unit is above the freezing point of water, after which first stage membrane unit 1 is bypassed and the flow back gas exiting the well is routed directly to said second stage membrane unit 2.

5. The process of claim 1 wherein said flow back gas is processed in said second stage membrane unit until the $CO_2$ concentration in said flow back exiting the well site has dropped to a range of from about 2 to about 10% $CO_2$ by volume, after which processing of the flow back gas is terminated and all flow back gas is sent directly to a gathering system.

6. The process of claim 1 additionally comprising processing said carbon dioxide depleted flow back stream rich in hydrocarbons exiting said second stage membrane unit in a natural gas separator configured to separate any condensed liquids from said stream, forming a condensed liquid stream and a gas stream rich in hydrocarbons.

7. The two stage membrane process of claim 1 wherein said first stage membrane unit or said second stage membrane unit or both of said first and second stage membrane units comprise separate outlet passages for liquid and gas retentate.

8. The process of claim 6 wherein the condensed liquids are subjected to one or more stabilization treatments to remove $CO_2$ and lower methane content to meet Y-grade specifications for commercial transport and use.

9. The process of claim 1 wherein at least one of said first stage membrane unit and second stage membrane unit comprises a membrane material resistant to the effects of condensed natural gas liquids.

10. The process of claim 9 wherein at least one of said first stage membrane unit and second stage membrane unit comprises a membrane material selected from Selective Dense or Asymmetric Polymer Membrane, Facilitated Transport Membrane, Liquid Support Membrane, Fixed Support Membrane, Membrane Gas Absorption Membrane; Inorganic Membrane; Mixed Matrix Membrane; and combinations thereof.

11. The process of claim 10 wherein the Selective Dense or Asymmetric Polymer Membrane is selected from the following membrane materials: cellulose acetate, polyimides, polyamides, perfluoropolymers, polysulfone, polycarbonates, polyetherimides, polyether ether ketone, fluoropolyimides, poly(amide-imide), poly(dimethylsiloxane), Polyethylene oxide, poly(phenylene oxide) with Nylon 6, polyaniline, polyaramides, polyarylates, polyarylene ether ketone, polyether ketone, polyetherimide, polyethersulfone, polyketone, polyphenylene sulphide, polypyrrolones, polysemicarbazides; and combinations thereof.

12. The process of claim 11 wherein said membrane material is selected from the group consisting of cellulose acetate, polyimides, polyamides, perfluoropolymer, polysulfone, polycarbonates, polyetherimides, and poly(ether ether ketone).

13. The process of claim 12 wherein at least one of said first stage membrane unit and second stage membrane unit comprises a polyether ether ketone (PEEK) membrane.

14. A system for processing flow back gas exiting a well site following the $CO_2$ stimulation of a subterranean formation, wherein said process comprises:
   a first stage membrane unit configured to separate water and water vapor from the flow back gas, forming a water-rich permeate stream and a water depleted flow back stream;
   a second stage membrane unit downstream from said first stage membrane unit configured to receive said water depleted flow back stream and separate out $CO_2$ from said water depleted flow back stream forming a carbon dioxide rich permeate stream and a carbon dioxide depleted retentate flow back stream rich in hydrocarbons,
wherein said flow back gas is processed in said first stage membrane unit until the temperature of the retentate stream (13) leaving the second stage membrane unit is above the freezing point of water, after which first stage membrane unit 1 is bypassed and the flow back gas exiting the well is routed directly to said second stage membrane unit 2.

15. The system of claim 14 further comprising a pretreatment unit configured for pretreating said flow back gas prior to processing said flow back gas in said first stage membrane unit.

16. The system of claim 15, wherein the pretreatment unit is configured to adjust the pressure and/or temperature of the flow back gas.

17. The system of claim 16 wherein said pretreatment unit is configured to remove at least one of water, solid particulates, liquid hydrocarbons, hydrogen sulfides or a combination thereof from the feed stream.

18. The system of claim 14 wherein said flow back gas is processed in said first stage membrane unit until the temperature of the retentate stream (13) leaving the second stage membrane unit is above the freezing point of water, after which first stage membrane unit 1 is bypassed and the flow back gas exiting the well is routed directly to said second stage membrane unit 2.

19. The system of claim 14 wherein said flow back gas is processed in said second stage membrane unit until the $CO_2$ concentration in said flow back gas exiting the well site has dropped to a range of from about 2 to about 10% $CO_2$ by volume, after which the system processing is terminated and all flow back gas is sent directly to a gathering system.

20. The system of claim 14 further comprising a natural gas liquids separator downstream of said second stage membrane unit to receive the carbon dioxide depleted flow back stream rich in hydrocarbons and separate any condensed liquids from said stream, forming a condensed liquid stream and a gas stream rich in hydrocarbons.

21. The system of claim 20 which further comprising a product separation unit downstream of said natural gas liquids separator to receive said condensed liquid stream and said gas stream rich in hydrocarbons, wherein said product separator optionally comprises a heater for heating said high gas stream rich in hydrocarbons and is operated at a predetermined pressure allowing any condensed hydrocarbons to recombine with said gas stream rich in hydrocarbons forming a natural gas product stream.

22. The system of claim 21 which additionally comprises a gas gathering system wherein said predetermined pressure of said heater is the pressure of the gas gathering system.

23. The system of claim 14 wherein at least one of said first stage membrane unit and second stage membrane unit comprises a membrane material resistant to the effects of condensed natural gas liquids.

24. The system of claim 23 wherein at least one of said first stage membrane unit and second stage membrane unit comprises a membrane material selected from Selective Dense or Asymmetric Polymer Membrane, Facilitated Transport Membrane, Liquid Support Membrane, Fixed Support Membrane, Membrane Gas Absorption Membrane; Inorganic Membrane; Mixed Matrix Membrane; and combinations thereof.

25. The system of claim 24 wherein the Selective Dense or Asymmetric Polymer Membrane is selected from the following membrane materials: cellulose acetate, polyimides, polyamides, perfluoropolymers, polysulfone, polycarbonates, polyetherimides, polyether ether ketone, fluoropolyimides, poly(amide-imide), poly(dimethylsiloxane), Polyethylene oxide, poly(phenylene oxide) with Nylon 6, polyaniline, polyaramides, polyarylates, polyarylene ether ketone, polyether ketone, polyetherimide, polyethersulfone, polyketone, polyphenylene sulphide, polypyrrolones, polysemicarbazides; and combinations thereof.

26. The system of claim 24 wherein said membrane material is selected from the group consisting of cellulose acetate, polyimides, polyamides, perfluoropolymer, polysulfone, polycarbonates, polyetherimides, and poly(ether ether ketone).

27. The system of claim 14 wherein at least one of said first stage membrane unit and second stage membrane unit comprises a polyether ether ketone (PEEK) membrane.

28. The system of claim 14 wherein the entire system or parts of the system are mobile.

29. The system of claim 14 wherein said first stage membrane unit or said second stage membrane unit, or both of said first and second stage membrane units comprise separate outlet passages for liquid and gas retentate.

30. The system of claim 15 comprising a flow meter and flow control valve (XV-3) to establish gas flow rate entering the membrane units, wherein said flow rate is fixed, or can vary automatically in response product gas (18) $CO_2$ concentration within the minimum and maximum flow constraints of the system.

31. A system for processing flow back gas exiting a well site following the $CO_2$ stimulation of a subterranean formation, wherein said system comprises:
   a pretreatment unit for processing flow back gas from a well site, wherein said pretreatment unit is configured to adjust feed pressure and/or temperature, and/or to remove any one of water, solid particulates, liquid hydrocarbons, hydrogen sulfides or a combination thereof from said flow back gas,
   a first stage membrane unit downstream of said pretreatment unit to receive the pretreated flow back gas therefrom and separate water vapor from the flow back gas, forming a water-rich permeate stream and a water depleted flow back stream;
   a second stage membrane unit downstream from said first stage membrane unit to receive said water depleted flow back stream and separate out $CO_2$ from said water depleted flow back stream forming a carbon dioxide rich permeate stream and a carbon dioxide depleted retentate flow back stream rich in hydrocarbons;

a natural gas liquids separator downstream of said second stage membrane unit to receive the carbon dioxide depleted flow back stream rich in hydrocarbons, wherein said separator is configured to separate any condensed liquids from said carbon dioxide depleted flow back stream, forming a condensed liquid stream and a gas stream rich in hydrocarbons;

a product separation unit downstream of said natural gas liquids separator to receive said condensed liquid stream and said gas stream rich in hydrocarbons, and a gas gathering system, wherein said product separation unit is operated at a pressure required by the gas gathering system, allowing any condensed hydrocarbons to recombine with said gas stream rich in hydrocarbons forming a natural gas product stream.

32. The system of claim 31 wherein said flow back gas is processed in said first stage membrane unit until the temperature of the retentate stream (13) leaving the second stage membrane unit is above the freezing point of water, after which first stage membrane unit 1 is bypassed and the flow back gas exiting the well is routed directly to said second stage membrane unit 2.

33. The system of claim 32 wherein said flow back gas is processed in said second stage membrane unit until the $CO_2$ concentration in the flow back gas exiting the well site has dropped to a range of from about 2 to about 10% $CO_2$ by volume, after which the system processing is terminated.

34. The process of claim 8 wherein said stabilization treatments include at least one of dehydration, desulfurization, heating, distillation, vapor/liquid separation, and addition of gas hydrate inhibitors.

* * * * *